United States Patent
Chang

[15] 3,698,655
[45] Oct. 17, 1972

[54] PACKING GUIDE FOR FLEXIBLE MATERIALS

[72] Inventor: David T. L. Chang, 438 College Avenue, Palo Alto, Calif. 94306

[22] Filed: Dec. 21, 1970

[21] Appl. No.: 99,842

[52] U.S. Cl...................................242/76, 242/75.2
[51] Int. Cl...........................................B65h 27/00
[58] Field of Search......242/76, 187, 55.21, 67.4, 68, 242/75.45

[56] References Cited

UNITED STATES PATENTS

| | | | |
|---|---|---|---|
| 3,153,517 | 10/1964 | Blank et al. | 242/55.21 |
| 3,519,213 | 7/1970 | Hofmann et al. | 242/187 X |

*Primary Examiner*—George F. Mautz
*Assistant Examiner*—Gregory A. Walters
*Attorney*—Thomas E. Schatzel

[57] ABSTRACT

A packing guide for guiding the path of a relatively moving flexible material, e.g. magnetic tape, entering a storage reel, the guide comprising an elongated arm pivotable about a given point, the arm being pivotal along a horizontal plane and vertical plane relative to the path of the flexible material; a roller mounted intermediate the terminal ends of the arm and adapted to engage the material and simultaneously apply a force component to said material along a plane substantially parallel to the path and a force component to said material along a plane substantially normal to the path.

6 Claims, 4 Drawing Figures

PATENTED OCT 17 1972 3,698,655

INVENTOR
DAVID T. L. CHANG

BY Thomas E. Schatzel

ATTORNEY

PACKING GUIDE FOR FLEXIBLE MATERIALS

BACKGROUND OF THE INVENTION

The present invention relates to a improved packing guide for guiding the path of a flexible material. An application in which the present guide has proven to provide improved performance is in the packing of magnetic tape on a reel. In the magnetic tape manufacturing industry magnetic tape is commonly prepared in relatively large sheets and then cut in strips of predetermined widths. The cut tape is then commonly stored on a storage reel having broad range tolerances. The tape as stored on the storage reel is commonly referred to as "raw" tape. Further steps to prepare the "raw" tape for industrial or commercial use include rewinding the tape from the storage reel to a flangeless reel about a hub. This is commonly referred to in the industry as winding the tape into a form referred to as a "pancake." A common requirement for the "pancake" is that each loop of tape of the pancake be precisely wound with the loops being of uniform tautness and the running edges even about a common reference. This permits visual inspection of the final reel of tape to aid in revealing the existence of imperfections and evaluating slits within the tape. Generally, with a uniform reel of tape, defective slits are visually apparent. Also, uneveness in the width of the tape may be apparent. Once the tape meets the requirements of visual inspection, flanges may be secured to the hub. In preparing the "pancake" it is necessary that the tautness of the loops be controlled. If the loops are too taut the loops tend to adhere to one another. The industry further demands that the rewinding from the storage reel to the "pancake" be at high speeds.

There have been various approaches attempted for aiding in the preparation of a "pancake" of tape. Embodiments include the use of air bearings to apply air jets at or near the point of tangency of the incoming tape on the pancake. The air jets apply a force against the surface of the tape which force is directed substantially normal to the axis of rotation to provide a taut reel. The "pancake" may simultaneously be supported on an inclined plane relative to the path of the incoming tape to provide a relative force in a direction substantially parallel to the axis of rotation. Such approaches have proven to be relatively complex in structure and to impose tape speed limitations.

Another approach includes the use of a flanged rotatable spool engaging the tape at or near the point of tangency of the incoming tape and the pancake such that the incoming tape is intermediate the pancake and the spool. The spool is rotatable about an axis relatively parallel with the axis of rotation of the pancake and carries two spaced apart flanges. The flanges are adapted to engage opposite longitudinal edges of the incoming tape. Such approaches have proven to impose tape speed limitations and to tend to cause adjacent loops of the tape to adhere to one another.

Other applications requiring precision tape guiding include tape printing and tape duplicating in which a plurality of tapes are simultaneously wound on a common hub or reel. In these applications it is common to utilize an individual guide for each tape as it is received by the hub or reel.

SUMMARY OF THE PRESENT INVENTION

The present invention provides an improved packing guide which when used for packing magnetic tape has proven to provide improved performance over the structures heretofore known. The structure is of simplified structure, permits high speed packing and permits controlled tautness in the loops.

The present invention provides for a rotatable member adapted to engage the tape or other flexible medium at or near the point of tangency of the wound medium and the path of the incoming medium. The rotatable member engages the medium to apply a force having a force component in a direction substantially normal to the axis of rotation of the wound medium and a force component in a direction substantially parallel to the axis of rotation of the wound medium. The rotatable member is engaged to an arm adapted to continuously support the rotatable member at or near the point of tangency as the outer diameter of the wound medium varies.

DESCRIPTION OF PREFERRED EMBODIMENTS

Figures 1, 2, 2A, 3:
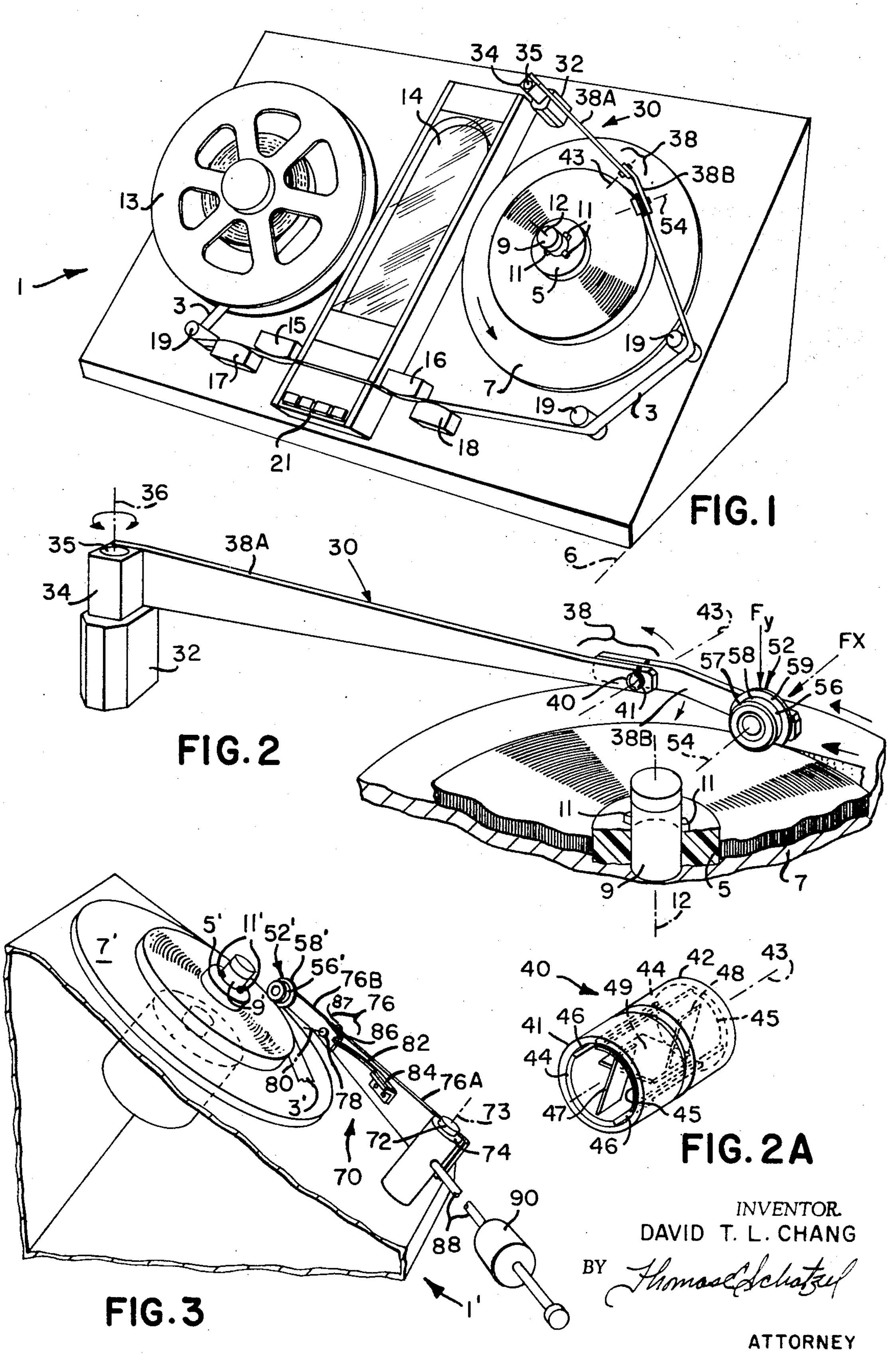
FIG. 1 is a perspective view of a tape winding deck incorporating a tape packing guide incorporating the teachings of the present invention.
FIG. 2 is an enlarged perspective view of a segment of the tape winding deck of FIG. 1 and the tape packing guide of FIG. 1.
FIG. 2A is an enlarged partially sectioned view of the flexure pivot spring of the guide of FIGS. 1.
FIG. 3 is a perspective view of a segment of the tape winding deck of FIG. 1 with an alternative view of a tape packing guide incorporating the teachings of the present invention.

The illustrated embodiment of FIGS. 1–2A illustrates the present invention as incorporated on an off-line tape winding deck, referred to by the general reference character 1 for cleaning, evaluating and packing a supply of magnetic tape 3 about a flangeless cylindrical hub 5. As commonly referred to in the magnetic tape manufacturing industry, the tape winding deck 3 is adapted to wind the tape 3 about the hub 5 in a flangeless reel form commonly referred to as a "pancake" form. The tape deck 1 is inclined relative to a horizontal reference plane 6. The hub 5 is held down in frictional engagement with a motor-driven, uniformly-flat, disc member 7. The hub 5 is held in engagement with the disc 7 by means of a hold down knob 9 having a set of retractable paws 11. The paws 11, when extended, are adapted to engage the top surface of the hub 5 to hold the hub in position as it is rotationally driven about an axis of rotation 12 common to the disc 7, the hub 5 and the hold-down knob 9. The illustrated tape winding deck 1 includes a tape supply reel 13 carrying a supply of the magnetic tape 3. The tape 3 is guided along a predetermined path intermediate the supply reel 13 and the reel formed on the hub 5. The path includes a vacuum chamber 14 positioned intermediate the supply reel 13 and the hub 5. The chamber 14 tends to control the tape tension within the tape path. In the process of rewinding the tape 3 from the supply reel 13 to the hub 5, the tape winding deck 1 is adapted to clean and evaluate the tape 3. The tape path, may include a plurality of magnetic transducers and tape evaluators 15, 16, 17 and 18 and guides 19. A control panel 21 is included to control the operation of the deck 1.

In winding the tape 3 about the hub 5, to establish the "pancake," it is desireable that the resultant reel permit detection of nonuniformities of width in the tape and other deformities if they are existent. Accordingly, the uniformly flat disc member 7 is adapted to provide a common reference plane to receive one running edge of the tape 3. Accordingly, any nonuniformities in width of the tape will be detectable by evaluating the edge of the resultant pancake.

FIGS. 1–2A illustrate an embodiment of a packing guide, referred to by the general reference character 30 positioned to continuously engage the tape 3 as it is wound to establish the flangeless reel or "pancake" centered by the hub 5. The guide 30 is adapted to continuously apply a uniform pressure on the tape 3 to urge one running edge of the tape against the surface of the disc 7 and to simultaneously provide a uniform tautness of the loops of tape relative to one another. It is necessary that the adjacent loops not be too taut as this may cause adherence between adjacent loops resulting in damage to the tape. At the same time, it is desireable for the loops to be sufficiently taut to provide for a uniform reel and of substantially uniform tautness for all loops relative to one another. Accordingly, the guide 30 is adapted to provide a force component $F_y$ in a direction substantially normal to the travel path of the tape 3 and normal to the plane of the disc 7 and a force component $F_x$ substantially normal to the travel path and parallel to the plane of the disc 7. The force components $F_x$ and $F_y$ are substantially normal relative to each other.

The packing guide 30 includes a base support anchor 32 anchored to the deck 1. The base anchor 32 carries a coupling sleeve 34 pivotal about an axle 35 having an axis of rotation 36 substantially parallel with the axis 12. An elongated arm 38 comprising a pair of arm segments 38A and 38B is secured to one surface of the sleeve 34 to permit the arm 38 to be pivoted about the axis 36 in a plane substantially parallel with the surface of the disc 7. The arm segment 38B carries a slight bend such that the arm 38 does not interfere with the tape "pancake" package. The arm segments 38A and 38B are interengaged by means of a flexure pivot spring 40 which is illustrated in enlarged detail in FIG. 2A. The flexure pivot spring 40 engages the arm segment 38A intermediate its terminal ends and intermediate the terminal ends of the segment 38B to permit the segment 38B to be resiliently rotated about the arm segment 38A.

The flexure pivot spring 40 comprises a paw of coaxial separated exterior cylinders 41 and 42 coaxial about an axis of rotation 43. The interior surface of the cylinder 41 is secured to an arcuate member 44 which extends longitudinally to the interior surface of the cylinder 42. The cylinder 42 is free to rotate about the member 44. The cylinder 42 is secured to an arcuate member 45 which extends longitudinally to the interior surface of the cylinder 41. The cylinder 41 is free to rotate about the member 45. The members 44 and 45 are angularly displaced relative to one another with a spacing 46 intermediate. A first leaf spring 47 is secured to the members 44 and 45 within the cylinder 41 and a leaf spring 48 is secured to the members 44 and 45 within the cylinder 42. The leaf springs 47 and 48 are positioned substantially parallel to one another. Intermediate the springs 47 and 48 is a leaf spring 49 secured to both arcuate members 44 and 45 within the interior of both cylinders 41 and 42. The spring 49 is positioned approximately normal to the springs 47 and 48.

As utilized with the packing guide 30, the arm segment 38A is secured to the cylinder 41 and the arm segment 38B to the cylinder 42.

About the other terminal end of the arm segment 38B is a roller 52 adapted to engage the reel of tape 3 at or near the point of tangency of the incoming tape 3. The roller 52 is rotatable about an axis of rotation 54 which is substantially normal to the axis of rotation 12 of the hub 5. The roller 52 carries a cylindrical segment 56. The cylinder segment 56 carries a tapered surface 57 and a flat surface 58. The surface 58 is adapted to engage the longitudinal running edge surface of the tape 3. The roller 52 has a flange 59 having a surface substantially normal to the surface segment 57. The flange surface 59 is adapted to engage the main surface of the tape 3 at or near the point of tangency of the incoming tape with the wound tape. The roller 52 is driven by the tape 3. The roller rotates clockwise responsive to the moving tape 3 as the disc 7 and hub 5 rotate counter clockwise about the axis 12. Preferably the roller 52 is comprised of a hard smooth material such as stainless steel having smooth polished surfaces to minimize friction and wear of the tape 3 and the roller 52.

Accordingly, in operation the arm 38 is pivotal relative to the base 32 within both the X and Y orthogonal planes both of which are substantially normal to the travel path of the tape 3. As the tape 3 is wound about the hub 5 the roller 52 frictionally engages the tape 3 at or near the point of tangency of the incoming tape 3 and the resultant reel about the hub 5. The inclined nature of the tape deck permits a gravatational force to be applied to the roller 52 in a plane along the axis 54 resulting in the continuous force component $F_x$ to be applied to the tape. The force component $F_x$ resiliently urges the incoming tape towards the surface of the outermost loop of the resultant reel. As the reel diameter changes, the reel continuously applies a counter force to the roller 52 and the roller 52 maintains continuous contact with the tape 3 and responsively moves towards or away from the axis 12. Simultaneously, the moment arm of the arm segment 38B and roller 52 provides for continuous urging of the roller 52 towards the surface of the disc 7 to establish the force component $F_y$. The flexure pivot spring 40 tends to resiliently oppose rotation of the arm segment 38B thereby controlling the net value of the force component $F_y$. In tape packing applications the force components may be in the order of a few ounces. As illustrated in FIGS. 1–2A, the force $F_x$ may be controlled by the degree of incline of the deck 1 relative to the plane 6, the weight of the roller 52 and the length of the arm 38. The force component $F_y$ may be controlled by the tension of the flexure pivot spring 40, the weight of the roller 52 and the length of the arm segment 38B.

FIG. 3 illustrates an alternative embodiment of tape packing guide of the present invention and referred to by the general reference character 70. The packing guide 70 may be utilized with a tape rewind deck similar to the deck 1 and accordingly the same reference characters with a prime designation are utilized to refer to similar components. The guide 70 includes a cylindrical base member 72 anchored to the deck 1'. A cylindrical sleeve 74 is secured about the member 72 and rotatable about the member 72 about a common axis 73.

An elongated arm 76 with a pair of arm segments 76A and 76B are secured to the sleeve 74. The segment 76A about one terminal end is secured to the sleeve 74 to permit rotation of the arm 76 about the axis of rotation 73. The arm segments 76A and 76B are interengaged intermediate their respective terminal ends by means of a cylindrical pin 78 having an axis of rotation 80. The arm segment 76B is engaged about the pin 78 such that the segment 76B is free to rotate about the axis of rotation 80. A leaf spring 82 is anchored about one terminal end by means of a fastener 84. The opposite terminal end of the spring 82 is engaged within a slot 86 of the arm segment 76B. An adjustable stopper 87 is engaged to the segment 76A to impose an adjustable stop to rotation of the arm 76B. The anchor 84 is elevated relative to the slot 86. Thus, the moment arm of the roller 52' and arm segment 76B tends to cause the arm 76B to rotate in a counter-clockwise direction about the axis 80. The stopper 87 controls the degree of rotation. With the spring 82 anchored at the anchor 84 and engaged with the slot 86 the spring 82 is under tension resiliently opposing any tendencies of the roller 52' from leaving the edge surface of the tape 3. Thus, the roller 52' is continuously urged against the tape 3' with a component force F*y*.

The sleeve 74 is further engaged to an arm 88 projecting therefrom in the opposite direction from the arm 76. One terminal end of the arm 88 is secured to the sleeve 74. A counter weight 90 is secured about the arm 88. The weight 90 is adjustable along the arm to adjust the moment arm to establish the desired force component F*x*.

The tape packing guides 30 and 70 have proven to substantially facilitate the packing of magnetic tape on flangeless reels. The guide has proven to perform at high tape speeds in the order of 400 – 1000 inches per second; the same guide may be used for packing tape of various widths; the guide does not have a tendency to establish wear on the tape or otherwise damage the tape; and the tautness of the loops may be controlled by controlling the force component F*x* to avoid adherence between adjacent loops of tape.

I claim:

1. A packing guide for guiding a flexible moving tape material, the guide comprising, in combination:

a base anchor member;

a first pivotable coupling engaged to said anchor member and pivotable about said anchor member;

an elongated arm engaged to said pivotable coupling, the arm projecting longitudinally from said coupling to adjacent to the path of travel of a moving flexible tape material, the elongated arm being comprised of a first and second arm segment, the first arm segment being engaged about one end to the first coupling means and about the other terminal end to a tension pivot member, said tension pivot member being pivotable about an axis normal to the longitudinal axis of said first arm segment, said second arm segment being engaged about one end to said tension pivot member and about the other terminal end to said roller, said tension pivot member providing a continuous force component on said roller along the edge surface of said tape material; and a flanged roller engaged to the arm at a position intermediate the terminal ends of the arm, the roller being flanged to simultaneously frictionally engage an edge surface and the main surface of the tape material as said tape material moves along said path of travel.

2. The packing guide of claim 1 in which said first arm segment engages said first coupling means intermediate the terminal ends of said first arm segment; and further including a counter weight means engaged to said first arm segment adjacent its other terminal end for providing a continuous force component on said roller in a direction normal to the main surface of said tape material.

3. Improved guiding apparatus for winding flexible tape material in a reel comprising, in combination:

a base member;

a rotatable hub supported by said base member, the hub being adapted to receive and pack in a reel a supply of flexible tape material transported over a path of travel along the surface of the base member from a supplied source, the hub being rotatable about a first axis of rotation;

an anchor member secured to said base member;

a first pivotable coupling means engaged to said anchor member and pivotable about said anchor member;

an elongated arm engaged to said pivotable coupling means, the arm projecting longitudinally from said coupling adjacent to the path of travel of said flexible tape material, the elongated arm being comprised of a first and a second arm segment, the first arm segment being engaged about one end to the first coupling means and about the other terminal end to a tension pivot member, said tension pivot member being pivotable about an axis normal to the longitudinal axis of the first arm segment, said second arm segment being engaged about one end to said tension pivot member and about the other terminal end to said roller, said tension pivot member providing a continuous force component on said roller along the edge surface of said tape material; and a flanged roller engaged to the arm about the terminus of the arm, the roller being flanged to simultaneously frictionally engage the edge surface and the main surface of the tape material as said tape material is transported along the surface of the base member.

4. The apparatus of claim 3 in which the roller is engaged to said arm at a location adjacent to the point of tangency of the outer loop of the reel and said path of travel.

5. The apparatus of claim 4 in which said first arm segment engages said first coupling means intermediate the terminal ends of said first arm segment; and further including a counter weight means engaged to said first arm segment adjacent its other terminal end for providing a continuous force component on said roller in a direction normal to the main surface of said tape material.

6. The apparatus of claim 4 in which said tension pivot member is in the form of a flexure pivot spring engaged to said first arm segment and to said second arm segment.

* * * * *